United States Patent Office 3,181,792
Patented May 4, 1965

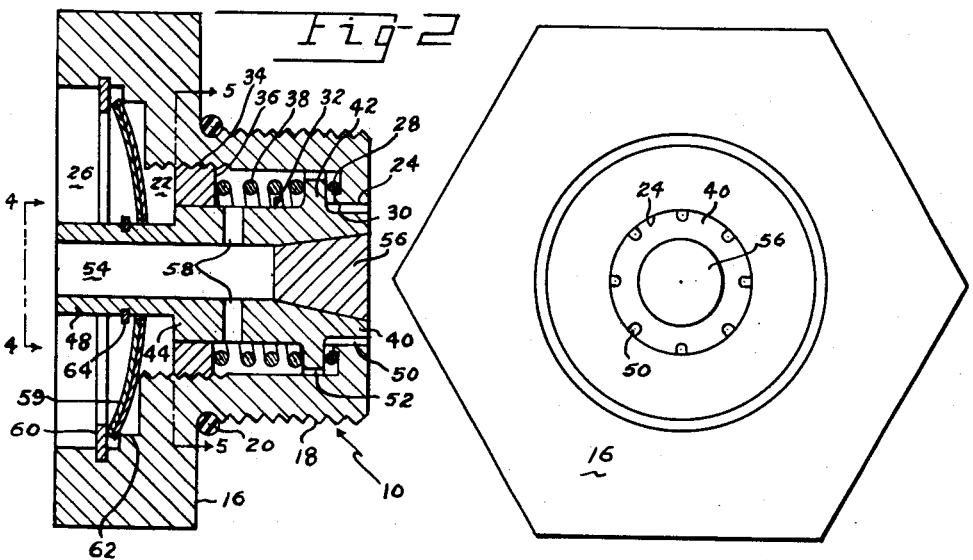
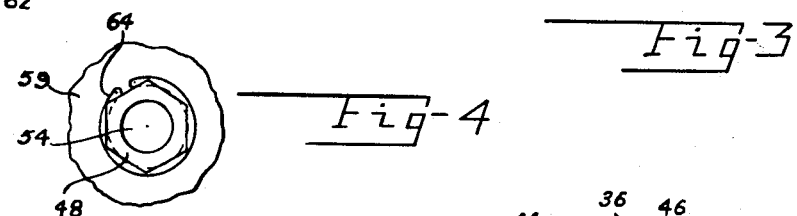
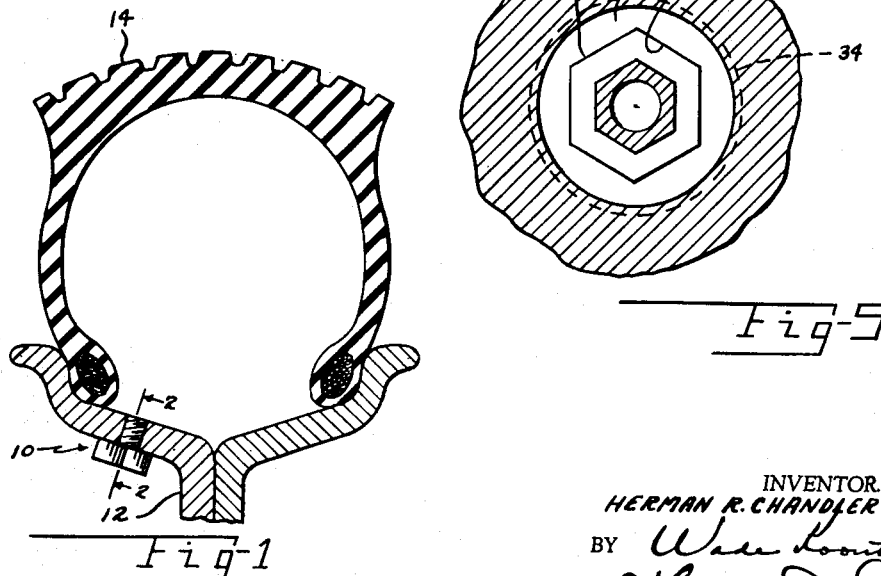

3,181,792
THERMAL-PRESSURE RELIEF DEVICE
Herman R. Chandler, 31 Shafor Circle, Dayton, Ohio
Filed Aug. 30, 1963, Ser. No. 305,893
8 Claims. (Cl. 236—92)
(Granted under Title 35, U.S. Code (1952), sec. 266)

The invention described herein may be manufactured and used by or for the Government for governmental purposes without the payment to me of any royalties thereon.

This invention relates to relief devices and, more specifically, to relief devices for use on closed pressure vessels and combining thermal and pressure sensitive elements into a common body. The relief device of this invention combines the pressure and thermal sensitive elements in a manner permitting one sensitive element to operate independently of the other elements.

While not limited to such use, and for purposes of illustration, this invention is shown and described as used in connection with the protection of aircraft from damage caused by tire and wheel failure resulting from excessive pressures or temperatures. The landing impact of a heavy airplane, such as a present-day bomber, is severe. Likewise, the heat generated in the tire structures and contained gas during the course of braking the airplane to a halt is enormous.

Unfortunately, ideal landing conditions, which result in minimum temperature and pressure rises, are the exception rather than the rule. The least pilot miscalculation, a gust of wind at the wrong time, emergency landings on secondary air strips, fog and other unusual weather conditions often result in imperfect landings which produce great pressure surges in tires, as well as temperature rises from severe use of the brakes. Tire and wheel failures, during landing, have resulted in the loss of many airplanes and lives; as well as the destruction of other property on the ground as a result of impact and excessive heat.

The primary object of this invention is to provide a thermal-pressure relief device for limiting the pressure rise of a confined gas.

Another object of this invention is to provide a thermal-pressure relief device having a single valve independently operable by both thermal and pressure sensing elements.

A further object of this invention is to provide a thermal-pressure relief device having a fusible blow-out plug operable if a predetermined emergency temperature is reached.

Additional objects, advantages and features of the invention reside in the construction, arrangement and combination of parts involved in the embodiment of the invention as will appear from the following description and accompanying drawings, wherein:

FIG. 1 is a reduced scale cross section of a typical airplane tire mounted on a split wheel and showing the device of this invention joined to a wheel rim to be in communication with the gas within the tire;

FIG. 2 is a rotated cross section on line 2—2 of FIG. 1 and showing the internal elements of the device;

FIG. 3 is an end view of FIG. 2;

FIG. 4 is a fragmentary end view along line 4—4 of FIG. 2 and showing the means for adjusting the pressure relief of the device, and FIG. 5 is a section along line 5—5 of FIG. 2 and showing in particular the means for rotating the spring pressure adjusting nut.

On FIG. 1, the thermal-pressure relief device, referred to in its entirety as device 10, is shown threadably joined to the rim portion of a typical split wheel 12 supporting tire 14. The device, as mounted, is pressure sensitive to the gas pressure within the tire, and is thermally sensitive to both the gas temperature and the adjacent wheel temperature.

Referring now to FIG. 2, the device 10 has a body 16, which may be conveniently made of hexagon bar stock to provide a means for engaging with a wrench when making installation on a wheel. One end of the bar stock is turned down to a convenient diameter and is externally threaded to have threads 18 for engaging like threads in wheel 12. Before installing, a suitable seal ring such as O-ring 20 is placed, as shown, to provide sealing means between the device and the wheel.

Coaxially passing through body 16 are a cavity 22, an inlet passage 24 communicating with the bottom of the cavity from the threaded end of the body and a counterbore 26 communicating with the open end of the cavity from the opposite or rear end of the body. The bottom of cavity 22 forms the structural means for supporting a seat ring 28 which acts as the valve seat. The seat ring 28 may be guided and coaxially retained to encompass the inlet passage 24 by means of retaining flange 30. The seat ring 28 may be made of any suitable material capable of withstanding the temperatures to be encountered; and having resistance to becoming bonded or adhering to the adjacent valve plug 32. A suitable material for seat ring 28 is General Electric Company's Viton. If desired, the seat ring may be cemented to the body 16. Although a seat ring 28 is used as a valve seat, other forms of seats may be used, as for example, a tapered metallic seat for engaging a tapered plug.

The open or outer end of cavity 22 contains threads 34 for engaging axially movable spring adjusting nut 36 which adjusts the compressive force of compression spring 38 acting to hold valve plug 32 against seat ring 28. The spring adjusting nut 36 is rotated by means of valve plug 32 in a manner to be hereinafter described. The threads may be made to have a slight interference fit in order to prevent creep from the adjusted position.

The valve plug 32 is an elongated element axially movable in body 16. The valve plug has an inlet guide 40 slidable within the inlet passage 24 of body 16, a flange 42 slidable within the unthreaded lower portion of cavity 22, a hexagon stem 44 engaging a similar hexagon opening 46 in spring adjusting nut 36 as best shown on FIG. 5, and terminates at the outer end in a second and smaller hexagon 48 as best shown on FIG. 4. The upper or rear face of flange 42 forms the spring saddle for compression spring 38 which holds the lower or forward face of the flange in engagement with seat ring 28 to prevent flow through the valve. The inlet guide 40 contains one or more flow passages 50 as shown on FIG. 2 and FIG. 3 which form the flow passages for admitting gas to the downstream side of seat ring 28. Similar flow passages 52, cut into the periphery of flange 42, provide the flow passages for the gas upstream from seat ring 28. The valve plug 32 further contains an axial bore 54 passing therethrough which is tapered at the forward end for retaining thermal plug 56, and a transverse bore 58 passing through the valve plug at any convenient place to be located between the rear face of flange 42 and the forward face of spring adjusting nut 36 as shown. The thermal plug 56 may be made of any suitable material which is cold setting to a solid state and melts to a liquid state at a temperature suitable for the particular application.

The compression spring 38 may easily be adjusted to the proper setting by means of an end wrench or a socket wrench engaging and turning the second hexagon 48 to thereby rotate the valve plug 32; thus causing the hexagon stem 44 to rotate and axially move the threaded spring adjusting nut 36. Provision other than hexagon 48 may be made as a means for rotating the valve plug; as for example: a slot in the rear end of the valve plug.

A temperature sensitive actuating means, such as bimetallic thermal unit 59, having an axially pierced bore passing over the hexagon 48 portion of valve plug 32, is nested within counterbore 26 of body 16, where it is retained by snap ring 60 which engages a groove in the periphery of the counterbore. The outer perimeter portion of the terminal unit 59 rests against the circular shoulder formed by the reduced diameter portion 62 of counterbore 26. Axially located in a groove on the second hexagon 48, so as to be out of contact with the thermal unit 59 when the unit is in its normally "cold" position, is snap ring 64. The groove retaining snap ring 64 should be cut deep enough to provide an adequate bearing surface for the bimetallic thermal unit 59 to axially engage and move the valve plug 32 from seat ring 28 when the thermal unit snaps into its "hot" position.

Device 10 has three modes of operation: (1) pressure only, (2) thermal operation during which the valve is open only during a period of overtemperature, and (3) emergency thermal operation, produced by a severe overtemperature, during which the entire tire or other pressure vessel is relieved of all contained gas.

During the first two modes of operation, the flow paths through the device are identical. The escaping gas enters the device through flow passages 50, between the seat ring 28 and the forward face of flange 42, through flow passages 52 in flange 42, and through transverse bore 58 into axial bore 54 from which it discharges into the atmosphere.

During the first mode of operation, the device operates as a conventional relief valve. A pressure rise causes the valve plug to open against compression spring 38 until the gas being relieved is reduced to the pressure against which the compression spring can close the valve.

During the second mode of operation, the bimetallic thermal unit becomes functional. As the thermal unit increases in temperature, it tends to flatten out until finally it snaps into engagement with snap ring 64 and lifts valve plug 32 from seat ring 28. The device permits the escape of gas until the temperature drops enough to permit the thermal disk to snap to its "cold" position. It must be pointed out that the second mode of operation is a composite operation during which the device is influenced by both temperature and pressure. It is quite obvious, in a tire or any other closed vessel confining a gas under pressure, that when there is a temperature rise, there will also be a pressure rise. Therefore, the bimetallic thermal unit 59 will receive an assist from the increased pressure during an overtemperature condition. Should the temperature drop when the device is bleeding gas, to permit the bimetallic thermal unit to return to its "cold" position while there is still an overpressure, the device will shift from the second mode operation to the first mode operation.

The third mode of operation occurs when the temperature becomes high enough to melt the thermal plug 56. Under this mode of operation all the gas within the tire or other vessel is permitted to escape.

A suitable dust cover may be installed over the outer exposed end of the device to prevent dust and moisture working its way into the functioning elements and causing a malfunction. Such a dust cover may be made of a plastic film material and may be installed in such manner that it will be either blown off or ruptured when the device bleeds gas. A cover of this type is well known and is not shown as constituting a part of this invention.

It is to be understood that the embodiment of the present invention as shown and described is to be regarded as illustrative only and that the invention is susceptible to variations, modifications and changes within the scope of the appended claims.

I claim:

1. A thermal-pressure relief device for relieving a closed vessel of gas under excessive pressure or temperature and comprising: a body for joining to said closed vessel, said body containing a cavity having an open end and an inlet passage into the cavity in said body for admitting gas from said closed vessel; a valve seat joined to the bottom of the cavity in said body to encompass the inlet passage into the cavity in said body; a valve plug operable within the cavity in said body to be openable from and closable against said valve seat in said body to control the gas flow entering the cavity in said body, said valve plug having a plurality of flow passages one of which communicates with the inlet passage in said body and the other flow passages communicating with the cavity in said body; a thermal plug within and blocking the flow passage in said valve plug communicating with the inlet passage in said body, said thermal plug being transformable from a solid state to a liquid state at a predetermined temperature to thereby unblock the flow passage; a pressure sensitive biasing means within the cavity in said body and acting against and biasing said valve plug against the said valve seat in said body; and a temperature sensitive actuating means retained within the cavity of said body and operably joined to said valve plug for opening said valve plug at a predetermined temperature of said body.

2. A thermal-pressure relief device for relieving a closed vessel of gas under excessive pressure or temperature and comprising: a body for joining to said closed vessel, said body coaxially containing a cavity having an open end at the rear of said body and an inlet passage at the forward end into the bottom of the cavity in said body for admitting gas from said closed vessel; a valve seat joined to the bottom of the cavity in said body to encompass the inlet passage into the bottom of the cavity in said body; a valve plug axially operable within the cavity in said body to be openable from and closable against said valve seat in said body to control the gas flow entering the cavity in said body, said valve plug having a plurality of flow passages one of which communicates with the inlet passage in said body and the other flow passages communicating with the cavity in said body; a thermal plug within and blocking the flow passage in said valve plug communicating with the inlet passage in said body, said thermal plug being transformable from a solid state to a liquid state at a predetermined temperature to thereby unblock the flow passage; a pressure sensitive compression spring coaxially surrounding said valve plug within the cavity in said body and acting against and biasing said valve plug against the said valve seat in said body; and a temperature sensitive actuating means retained within the cavity of said body and operably joined to said valve plug for opening said valve plug at a predetermined temperature of said body.

3. A thermal-pressure relief device in accordance with claim 2 and further having: a rotatable spring adjusting nut threadably engaging the cavity in said body and being rotatable by rotating said valve plug.

4. A thermal-pressure relief device for relieving a closed vessel of gas under excessive pressure or temperature and comprising: a body for joining to said closed vessel, said body coaxially containing a cavity having an open end at the rear of said body and an inlet passage at the forward end into the bottom of the cavity in said body for admitting gas from said closed vessel; a seat ring joined to the bottom of the cavity in said body to encompass the inlet passage into the cavity in said body; a valve plug axially operable within the cavity of said body to be openable from and closable against said seat ring to control the gas flow entering the cavity in said body, said valve plug having an axial bore therethrough in communication at the forward end with said closed vessel and a transverse bore communicating with the axial bore to provide passages for the discharge of gas from the cavity in said body; a thermal plug within and blocking the forward end of the axial bore in said valve plug, said thermal plug being transformable from a solid state to a liquid state at a predetermined temperature to thereby unblock the forward end of the axial bore; a pressure sensitive compression spring coaxially surrounding said valve plug within the cavity in said body and acting against and biasing said valve plug against said seat ring; and a temperature sensitive actuating means retained within the cavity of said body and operably joined to said valve plug for opening said valve plug at a predetermined temperature of said body.

5. A thermal-pressure relay device in accordance with claim 4 and further having: a rotatable spring adjusting nut threadably engaging the cavity in said body and being rotatable by rotating said valve plug.

6. A thermal-pressure relief device for relieving a closed vessel of gas under excessive pressure or temperature and comprising: a body for joining to said closed vessel, said body coaxially containing a cavity open at the rear and terminating in a counterbore, and having an inlet passage at the forward end into the bottom of the cavity in said body for admitting gas from said closed vessel; a seat ring joined to the bottom of the cavity in said body to encompass the inlet passage into the cavity in said body; a valve plug axially operable within the cavity in said body to be openable from and closable against said seat ring to control the gas flow entering the cavity in said body, said valve plug having guide means at the forward end engaging the inlet passage in said body and further having an axial bore therethrough in communication at the forward end with said closed vessel and a transverse bore communicating with the axial bore to provide passages for the discharge of gas from the cavity in said body; a thermal plug within and blocking the forward end of the axial bore in said valve plug, said thermal plug being transformable from a solid state to a liquid state at a predetermined temperature to thereby unblock the forward end of the axial bore permitting the discharge of the gas within said closed vessel; a pressure sensitive compression spring coaxially surrounding said valve plug within the cavity in said body and acting against and biasing said valve plug against said seat ring; and a bimetallic temperature sensitive actuating means retained within the counterbore of said body and operably joined to said valve plug for opening said valve plug at a predetermined temperature of said body.

7. A thermal-pressure relief device in accordance with claim 6 and further having: a rotatable spring adjusting nut threadably engaging the cavity in said body and being rotatable by rotating said valve plug.

8. A thermal-pressure relief device for relieving a closed vessel of gas under excessive pressure or temperature and comprising: a body for joining to said closed vessel, said body coaxially containing a cavity open at the rear and terminating in a counterbore, and having an inlet passage at the forward end into the bottom of the cavity in said body for admitting gas from said closed vessel; a seat ring joined to the bottom of the cavity in said body to encompass the inlet passage into the cavity in said body; a valve plug axially operable within the cavity in said body to be openable from and closable against said seat ring to control the gas flow entering the cavity in said body, said valve plug externally having a flange the forward face of which engages said seat ring, a hexagon stem extending rearward from the flange and terminating at the rear end of said valve plug in means for applying external force to rotate said valve plug, and further having at the forward end of said valve plug a guide means engaging the inlet passage in said body, and internally having an axial bore therethrough in communication at the forward end with said closed vessel and a transverse bore rearward from the flange engaging said seat ring and communicating with the axial bore to provide passages for the discharge of gas from the cavity in said body; a thermal plug within and blocking the forward end of the axial bore in said valve plug, said thermal plug being transformable from a solid state to a liquid state at a predetermined temperature to thereby unblock the forward end of the axial bore permitting the discharge of the gas within said closed vessel; a pressure sensitive compression spring coaxially surrounding said valve plug rearward from the flange on said valve plug and biasing said valve plug against said seat ring; a spring adjusting nut having a hexagon opening therethrough slidably engaging the hexagon stem of said valve plug and threadably engaging the cavity in said body, said adjusting nut being rotatable to adjust said compression spring by the rotation of said valve plug by external means; and a bimetallic temperature sensitive actuating means retained within the counterbore of said body and operably joined to said valve plug for opening said valve plug at a predetermined temperature of said body.

References Cited by the Examiner

UNITED STATES PATENTS

| | | | |
|---|---|---|---|
| 469,853 | 3/92 | Gibson | 137—543.13 X |
| 1,972,171 | 9/34 | Spencer | 236—92 |
| 2,031,558 | 2/36 | Clifford | 236—92 |
| 2,501,185 | 3/50 | Moorehead | 236—92 |
| 2,740,586 | 4/56 | Chaniot | 236—92 |
| 2,862,538 | 12/58 | McNulty | 236—93 X |

EDWARD J. MICHAEL, *Primary Examiner.*

ALDEN D. STEWART, *Examiner.*